W. E. Kidd.
Pressing Hats.
No 421
Reissued Jan. 13, 1857.
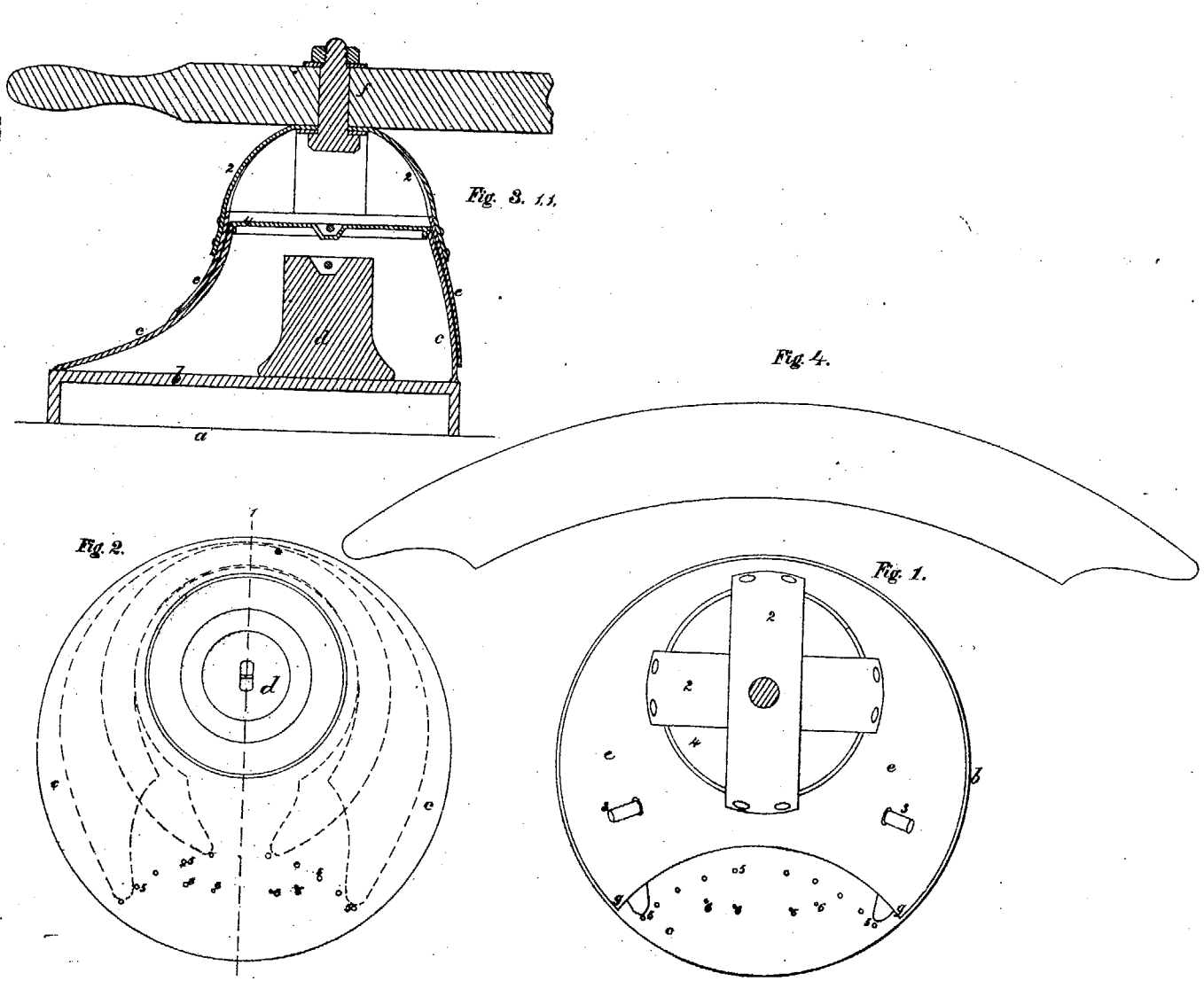
Witnesses,
Joel B. Wilson
Inventor,
William E. Kidd

UNITED STATES PATENT OFFICE.

WHITTEN E. KIDD, OF NEW YORK, N. Y.

IMPROVEMENT IN MOLDS FOR PRESSING BONNET-FRONTS.

Specification forming part of Letters Patent No. 11,996, dated November 28, 1854; Reissue No. 421, dated January 13, 1857.

*To all whom it may concern:*

Be it known that I, WHITTEN E. KIDD, of the city, county, and State of New York, have invented new and useful Improvements in Apparatus for Pressing and Shaping Buckram or Willow Bonnet-Fronts; and I do hereby declare that the following is a full, clear, and exact description thereof, reference being had to the accompanying drawings, making part of this specification, in which—

Figure 1 is a plan of the apparatus; Fig. 2, a plan of the lower mold; Fig. 3, a vertical section of the apparatus, taken in the vertical plane of the line 1 1 of Fig. 2; and Fig. 4 is a plan of the strip of buckram as prepared to be pressed in the form of a bonnet-front.

The same letters indicate like parts in all the figures.

In making frames for ladies' bonnets of buckram or similar material the flaring front is made of a separate strip cut of the required size, and after this has been bent and pressed to the required flaring form and curve it is then applied, while in a moist state, to the edge of the crown, and heat and pressure applied, which causes the gummy preparation of the buckram to cement and unite them.

The object of my invention is to give to such fronts the complete configuration which they are required to have when the bonnet is completed preparatory to the usual process of uniting it with the crown. The buckram or other material of which bonnet-frames are made is prepared, in the process of manufacturing, with a gummy substance, which becomes adhesive when moistened and heated, and if the required curvature be given to this material by the application of heat and pressure while it is in a moistened state the gummy substance becomes softened, and in that softened state the fibrous material of the buckram can be contracted or stretched to assume the required configuration, which becomes fixed by the said gummy substance as it dries under the influence of heat. In view of this it is important while giving the flaring and curved form to such a front to have the tips or ends of the strip of buckram or other material held in the position relatively to each other which they are to have when the bonnet is completed, otherwise the regularity and grace of the curvature will be injured by changing the position of the tips or ends to each other—as, for instance, if, during the process of stretching or contracting to give the required curvature or flaring form, the ends be placed farther apart or nearer together than they are required to be when the bonnet is completed, the curve at the top will be materially injured when the ends are brought to the required position, either during the process of completing the frame or after the bonnet has been finished, and in consequence the bonnet will not be so handsome, nor will it be as comfortable to the wearer. This desideratum has been accomplished by my invention in the following manner, viz:

On a suitable table, *a*, I place a flanged or other plate, *b*, to which is properly fitted the lower edge of a hollow mold or die, *c*, made of copper or other suitable metal. The outer polished surface presents the curved and flaring shape required to be given to the bonnet-front. The surface is only so much wider than any one bonnet-front that all variety of sizes, if desired, may be developed upon it, as represented in Fig. 2, where the smallest and the largest size are indicated by dotted lines. The form of the surface of this mold or die presents a slightly convex line on the vertical plane of the section, Fig. 3, which corresponds with the middle or upper part of the front, and a deeply concave line on the opposite side, which will be midway between the two ends of the front, as indicated by the dotted line 1 1 of Fig. 2, and the dotted lines indicating the position of the fronts on the mold. This surface, from the line of greatest convexity, gradually changes to concavity on either side until it reaches the line of greatest concavity on the opposite side of the axis of the mold. From this it will be seen that the size of the bonnet front to be produced will not only depend upon the size of the strip of material from which it is to be made, but also upon the distance between its two ends when placed and held on the mold, as indicated by the dotted lines in Fig. 2. And it will also be seen that as the strip of buckram, cut of the form represented in Fig. 4, is flat, when bent around the mold, as represented by dotted lines in Fig. 2, only small portions of it will touch the concave and convex surface of the mold, and that by reason of its elasticity the ends will tend constantly to spread out and leave the mold. From this it follows that when pressure is applied to make it assume the form of the mold the ends must be held in proper position until the pressure is upon it. This mold, as before stated, is hollow to receive a heater, *d*, and for the convenience of putting it in and taking it out the top of the mold is provided with a flanged cover, 4; but the heater, if desired, may be introduced in any other suitable manner. It is necessary, however, that while working the mold should be kept at a temperature of 150° to 200°, to soften the moistened gummy substance of the buckram while it is being pressed into the required form, and also to evaporate the moisture to reharden the gum, that it may retain the form which has been given to the fabric by the mold. To the outside of this mold or die is accurately fitted a matrix or upper die, *e*, also made of polished sheet-copper or other suitable metal, the upper part of which is connected with a lever, *f*, by means of two curved strips of metal, 2 2, placed at right angles with each other, and by a bolt passing through a hole in the strips of metal and the lever *f*, which said lever is to be operated in any suitable manner to work the matrix or upper die up and down alternately to make and relieve the pressure. Pins 3 3 project from the outer surface of this matrix to receive heaters. A portion of this matrix is cut out, as at *g g*, so as to leave the extreme ends of the strip of buckram, when laid on the mold, exposed, as represented in Fig. 1, that the operator may conveniently direct and hold them to any of a series of marks, 5 5 and 6 6, according to required size of bonnet-fronts required to be produced.

As the mold *c* need not extend beyond a height required for the production of the smallest size of bonnet-fronts, a very slight upward motion of the matrix will enable the operator to introduce the strip of buckram, which he does by taking the two ends and bringing them to either of the series of marks 5 5 or 6 6, and there holding them while the matrix is brought down to make the required pressure. This pressure should be relieved to permit the vapor induced by the heat to escape, and then reapplied, that the gummy substance may be dried and hardened while the form is preserved by contact with the mold and matrix.

The best mode of operating the matrix is to lift it by a spring acting on the lever *f*, and depress it, to make pressure, by a treadle connected in any suitable manner with the said lever *f*; but as this arrangement of mechanism is very familiar it is not deemed necessary to represent it. The convenience of this arrangement will be manifest, as it enables the operator to work the matrix with one foot, leaving his hands free to control the material to be pressed; and although I deem the cutting out of a part of the matrix the most convenient device to enable the operator to control the ends of the strip of material to be molded, nevertheless I do not wish to confine myself to such mode, as other equivalent modes may be substituted.

I am aware that molds have long since been used for pressing bonnet-fronts, but on a principle entirely different from my said invention, the matrix in such cases having been made to move toward and from the mold in a radial line, instead of moving in the line of the axis, and in consequence the complete form required could not be given, as a form exceeding the half of a circle could not be produced by such means, and even when reaching or approaching half a circle the pressure applied to the ends was necessarily very imperfect and had a tendency, by friction, to tear apart the material subjected to the pressure; but by my said invention I am not limited to the half of a circle, and the required form complete for bonnet-fronts can be produced. And I am also aware that it has been proposed to press bonnets and bonnet-frames entire by a mold and matrix with the matrix moving in the line of the axis; but in such cases the result obtained by my said invention could not be produced, because the mold was not provided with heaters to keep up the required heat to soften the moistened gummy substance and resolidify it while under pressure to preserve the form required, and by reason of the great height of the mold a range of motion was required to be given to the matrix, which rendered the apparatus of no practical utility, and, what is of greater importance, no mode was provided by which the operator could direct, adjust, and control the ends of the strip for forming the front during the application of pressure. I do not therefore wish to be understood as making claim, broadly, to the combination of a mold and matrix for pressing bonnets or bonnet-fronts; but What I do claim as my invention, and desire to secure by Letters Patent, is—

The hollow metallic mold, substantially such as described, of the form required to give the complete form required for bonnet-fronts, and provided with a mode of imparting to it the required temperature, and the matrix of corresponding form to make pressure by a motion in or nearly in the line of the axis, when the said mold and matrix are used in connection and in combination with the means herein described for controlling the position of the strip to be pressed, or any equivalent therefor, as set forth.

WHITTEN E. KIDD.

Witnesses:
WM. H. BISHOP,
JOEL B. WILSON.